(12) United States Patent
Meldrum et al.

(10) Patent No.: US 6,697,478 B1
(45) Date of Patent: Feb. 24, 2004

(54) SIMULTANEOUS TELEPHONE RING APPARATUS AND METHOD

(75) Inventors: Robert G. Meldrum, Redmond, WA (US); James R. Cheshire, Cincinnati, OH (US)

(73) Assignee: Parallel Communications, Inc., Seattle, WA (US)

( * ) Notice: Subject to any disclaimer, the term of this patent is extended or adjusted under 35 U.S.C. 154(b) by 60 days.

(21) Appl. No.: 09/665,839

(22) Filed: Sep. 20, 2000

(51) Int. Cl.⁷ .............................. H04M 3/42; H04M 7/00
(52) U.S. Cl. ............................. 379/211.04; 379/221.01
(58) Field of Search ..................... 379/211.04, 211.02, 379/207.02, 207.16, 201.01, 219, 220.01, 221.01, 229, 230

(56) References Cited

U.S. PATENT DOCUMENTS

| | | |
|---|---|---|
| 4,893,335 A | 1/1990 | Fuller et al. |
| 5,103,448 A | 4/1992 | Barnes et al. |
| 5,166,972 A | 11/1992 | Smith |
| 5,206,901 A | 4/1993 | Harlow et al. |
| 5,375,161 A | 12/1994 | Fuller et al. |
| 5,430,791 A | 7/1995 | Feit et al. |
| 5,454,032 A | 9/1995 | Pinard et al. |
| 5,502,762 A | 3/1996 | Andrew et al. |
| 5,668,862 A | 9/1997 | Bannister et al. |
| 5,673,299 A | 9/1997 | Fuller et al. |
| 5,724,411 A | 3/1998 | Eisdorfer et al. |
| 5,729,599 A | 3/1998 | Plomondon et al. |
| 5,745,850 A | 4/1998 | Aldermeshian et al. |
| 5,752,191 A | 5/1998 | Fuller et al. |
| 5,768,356 A | 6/1998 | McKendry et al. |
| 5,802,160 A | 9/1998 | Kugell et al. |
| 5,815,562 A | 9/1998 | Iglehart et al. |
| 5,904,013 A | 5/1999 | Greenspan et al. |
| 5,930,338 A | 7/1999 | McKendry et al. |
| 6,011,843 A | 1/2000 | Hochman et al. |
| 6,021,176 A | 2/2000 | McKendry et al. |
| 6,026,153 A | 2/2000 | Fuller et al. |
| 6,058,178 A | 5/2000 | McKendry et al. |
| 6,141,556 A | 10/2000 | Dougherty et al. |
| 6,185,283 B1 | 2/2001 | Fuller et al. |
| 6,205,139 B1 | 3/2001 | Voit |

FOREIGN PATENT DOCUMENTS

EP  0 549 126 A2  6/1993

*Primary Examiner*—Benny Tieu
(74) *Attorney, Agent, or Firm*—Perkins Coie LLP

(57) ABSTRACT

Methods and apparatus for a simultaneous ring system. The system is configured to be coupled to the end-user line of the telephone network. In response to receiving an incoming call on the user-line, the simultaneous ring system simultaneously ring target phone numbers associated with the telephone number and transfers the telephone call to the telephone network if a connection to one of the target phone numbers is made. These and other advantages of the present invention will become apparent upon reading the following detailed descriptions and studying the various figures of the drawings.

56 Claims, 16 Drawing Sheets

SIMULTANEOUS TELEPHONE RING APPARATUS AND METHOD

BACKGROUND OF THE INVENTION

1. Field of Invention

The present invention relates generally to telephone communication systems, and more particularly, the present invention relates to a simultaneous telephone ring system and method.

2. Description of the Related Art

Trends such as telecommuting, virtual offices, contract employment, etc. have led to the proliferation of both land-based and cellular phone services. It is not uncommon for a person to have different telephone numbers at their corporate office, their home office, their home, and one or more cell phone numbers. Callers are therefore often required to dial multiple numbers in order to reach a person. This is not only a waste of time, but expensive. A number of prior "simultaneous ring" systems have been proposed.

One type of known simultaneous ring system relies on an Advanced Intelligent Network (AIN), which is a computer (or set of computers) that is integrated into the (typically Signaling System Seven (SS7)) control network of a phone company. For example at Cincinnati Bell Telephone, an AIN system has been programmed to implement a simultaneous ring service. When a call to a telephone number with the simultaneous ring service is placed on the SS7 telephone network, the AIN looks up the associated target telephone numbers in a database and rings each number. If one of the phones is answered, a talk path is established and the calls to the other target telephone numbers are terminated. This arrangement, however, has several drawbacks. AIN systems are very expensive, complicated, and difficult to maintain. The AIN system also has to be integrated into the SS7 telephone network and therefore has to be implemented by the phone company.

Another type of known simultaneous ring system relies on a PBX or some other type of central switching device which associates one or more target phone numbers with an incoming telephone number. When a telephone call on the incoming number is received, the central switching device places a call to each of the target phone numbers. If one of the target phone numbers is answered, a link through the switching device to the target number is established. This arrangement, which is sometimes referred to as "conferencing" or "bridging", requires the central switch to maintain the link for the entire duration of the telephone call. Consequently conferencing or bridging is expensive because phone service charges are accrued during the entire duration of the phone call.

A simultaneous ring system and method that connects to a telephone company network over a standard end-user service line and which performs a call transfer using the telephone company network when a connection is made with a target phone number, thereby avoiding conferencing or bridging, is therefore needed.

SUMMARY OF THE INVENTION

The present invention relates to an apparatus and method for providing simultaneous ring services for a telephone number associated with an end-user line of a telephone network. The system includes a simultaneous ring system configured to couple the incoming caller line to the answering (or default) end-user line of the telephone network. In response to receiving an incoming call on the user-line, the simultaneous ring system simultaneously rings target phone numbers associated with the telephone number and then transfers the telephone call to the telephone network if a connection to one of the target phone numbers is made. If a connection is not made (i.e., the call is not answered), the incoming call is transferred to the user's default target, which is typically their Voice Mail. These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIGS. 7A through 7J are screen shots of exemplary web pages hosted by the simultaneous ring system for signing up for the simultaneous ring service and administering an existing account on the simultaneous ring service of the present invention.

DETAILED DESCRIPTION OF THE EMBODIMENTS

Figure 1:
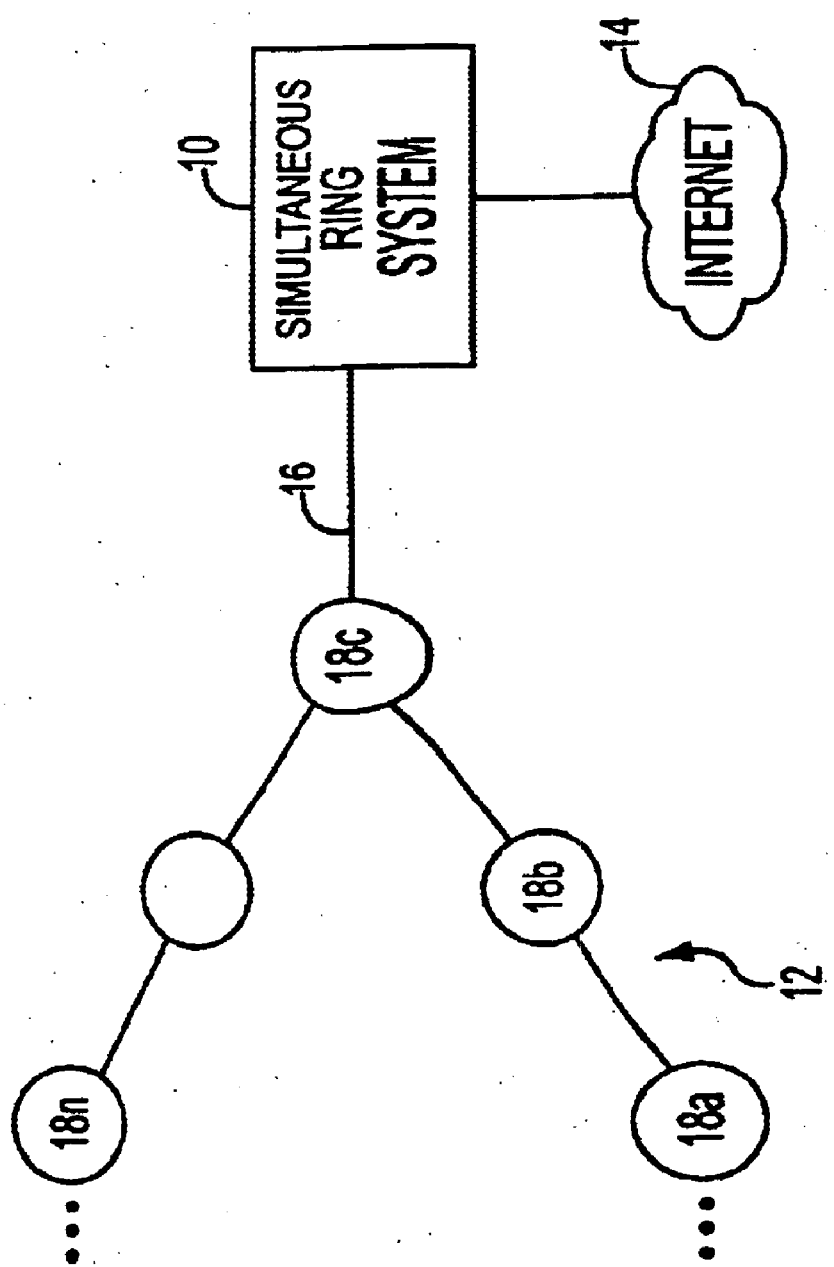
FIG. 1 is a diagram of the simultaneous ring system of the present invention coupled between a telephone company phone network and the Internet.

Referring to FIG. 1, a diagram of the simultaneous ring system 10 of the present invention is shown coupled between a telephone network 12 and the Internet 14. A standard user telephone line 16 is used to connect the phone network 12 and the simultaneous ring system 10. The phone network 12 includes a plurality of switching stations 18a–18n connected together in an arrangement commonly called a Signaling System 7 (SS7) network used for call set-up and disconnect. As is well known in the art, the SS7 network is used for establishing a call path between a caller and a target phone number. A separate voice path network is used once the call path is established. The simultaneous ring system 10 is also coupled to the Internet 14 either indirectly through an Internet Service Provider (not shown) or directly. In either arrangement, the Internet 14 allows Internet users to access the simultaneous ring system 10 for a variety of reasons, such as to sign-up for the simultaneous ring service or to update an existing simultaneous ring account, as is described in greater detail below.

Figure 2:
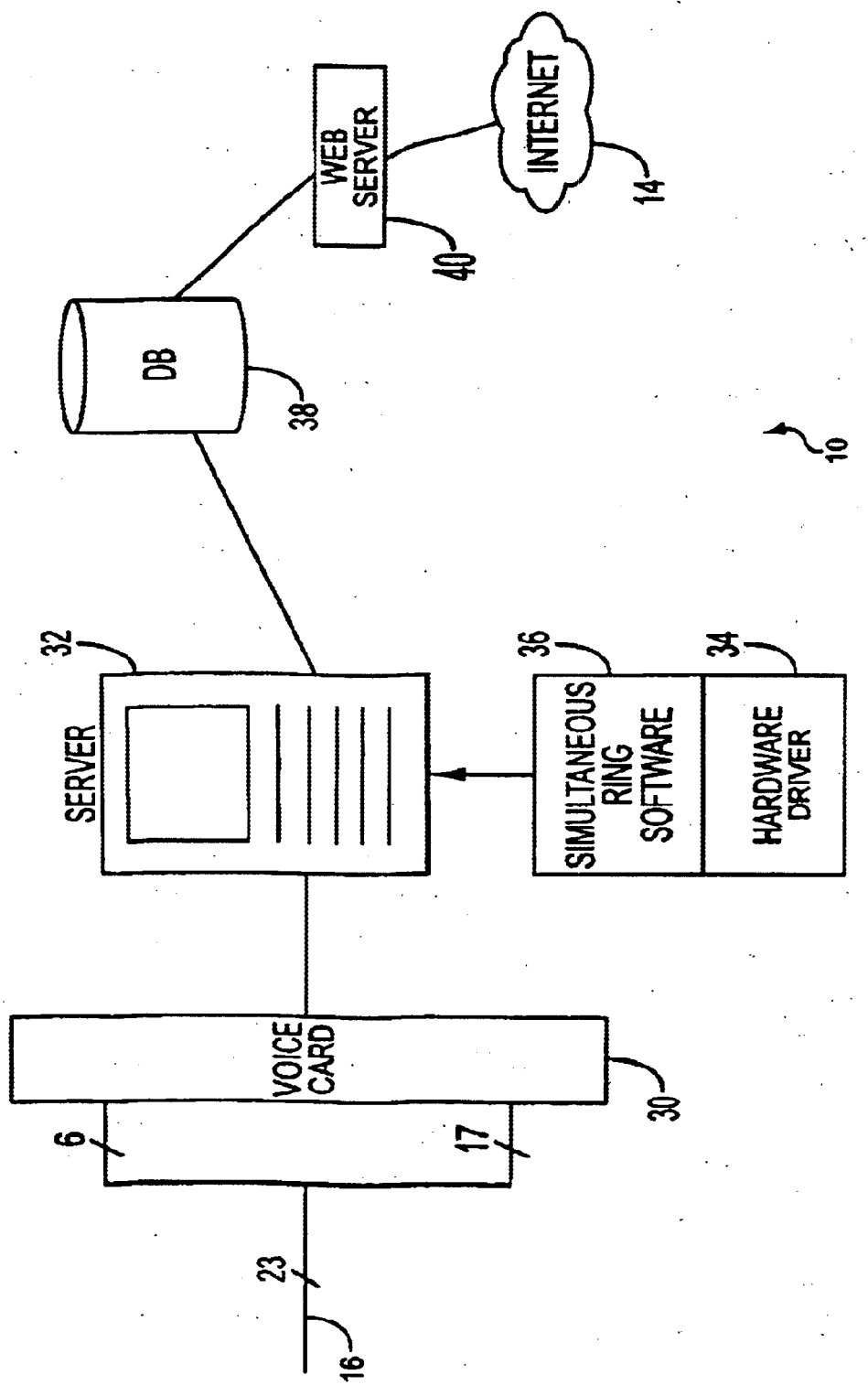
FIG. 2 is a block diagram of the simultaneous ring system of the present invention.

Referring to FIG. 2, a block diagram of the simultaneous ring system 10 is shown. The simultaneous ring system 10 includes a voice card 30 coupled to the user telephone line 16, a server 32 including a hardware driver 34 and simultaneous ring software 36 to control operation of the simultaneous ring system 10, a relational database 38 for storing subscriber record information and target telephone number information, and a web server 40 coupled between the database 38 and the Internet 14. In one embodiment, the voice card is a model D480/SC-2T1 from Intel Corporation (Dialogic Subsidiary), Santa Clara, Calif. The user telephone line 16 is an Integrated Services Digital Network (ISDN) line with Two B-Channel Transfer (TBCT) capability. For example the user telephone line 16 may be a "Primary Rate Interface (ISDN-PRI)" twenty-three B-Channel and one D-Channel line with six lines used for incoming calls and seventeen lines used for outgoing calls. In alternative embodiments, other types of user telephone lines 16 may be used, such as ISDN PRI European Standard and ISDN Basic Rate Interface (BRI). The hardware driver 34 provides an interface between the voice card 30 and the server 32. The database 38 is accessible by both the server 32 and by Internet users through the web server 40. In alternative embodiments, the number of channels provided on the user telephone line 16 may vary depending on the number of subscribers to the simultaneous ring system 10 and the amount of incoming telephone calls. In the situations where the number of subscribers and incoming telephone call traffic is high, multiple user telephone lines 16 and voice cards 30 may be needed.

In one embodiment, the user telephone line 16 provides a Primary Rate Interface (PRI) service between the telephone network 12 and the simultaneous ring system 10. With the PRI service, a large number of telephone numbers (i.e., 500 or more) are associated with the telephone line 16. Telephone calls received by the telephone network 12 corresponding to the PRI telephone numbers are offered to the simultaneous ring system 10. With this arrangement, a simultaneous ring subscriber is assigned to one of the PRI telephone numbers. One telephone line 16 can therefore service multiple simultaneous ring subscribers. If the number of subscribers exceeds the number of telephone numbers associated with the PRI service, then additional simultaneous ring systems 10 and/or telephone lines 16 with PRI service may by added in a modular fashion so that any number of subscribers can be serviced by any of the simultaneous ring systems and/or telephone lines with PRI service.

Figure 3:
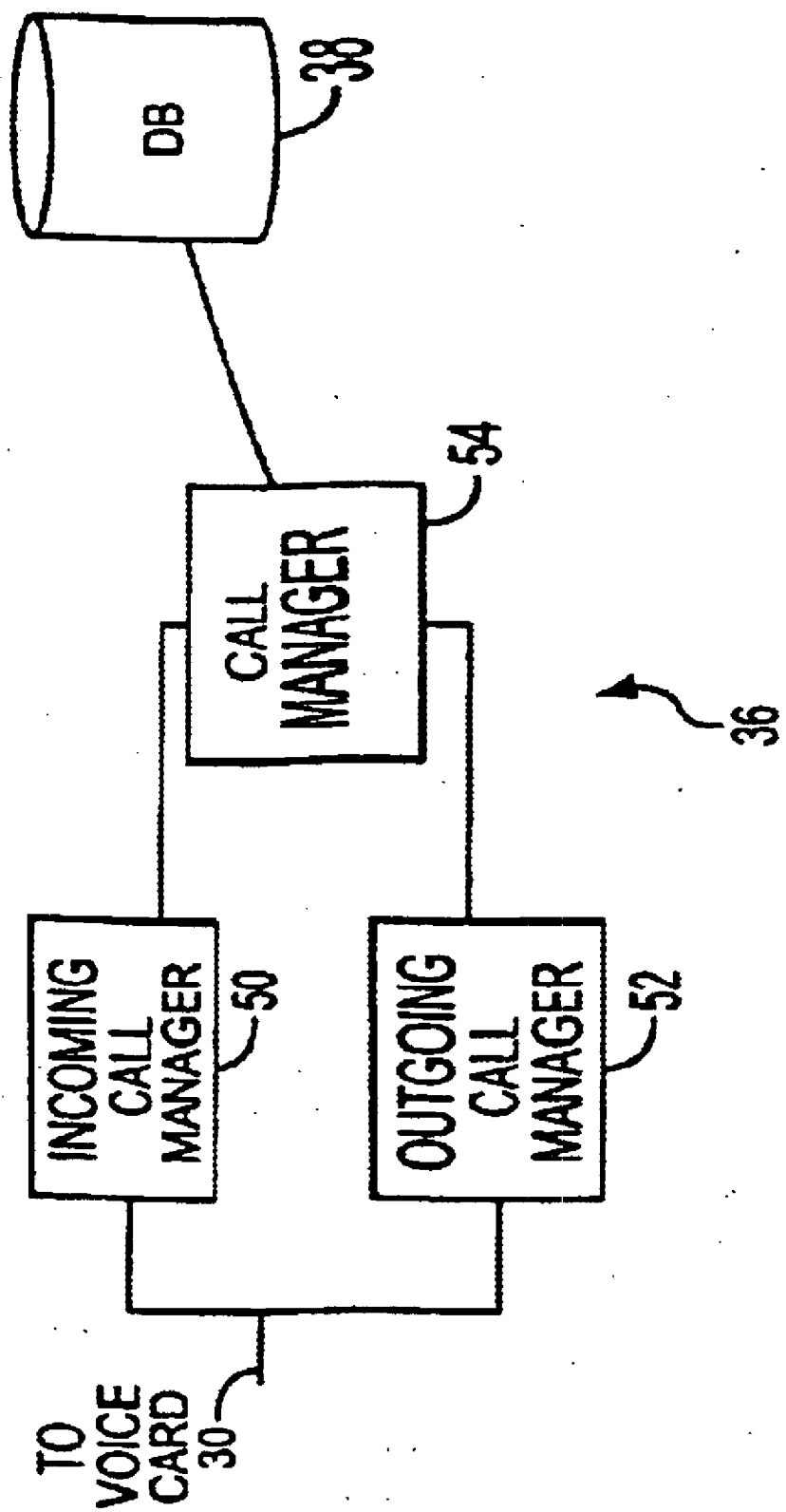
FIG. 3 is block diagram of simultaneous ring modules contained within the simultaneous ring system.

Referring to FIG. 3, a block diagram of the modules contained in the simultaneous ring software 36 is shown. The simultaneous ring software 36 includes an incoming call manager 50, an outgoing call manager 52, and a call manager 54. The incoming call manager 50 handles inbound call notification by passing the SS7 signal received on one of the incoming channels of the user telephone line 16 to the call manager 54 and generates a ringing signal so that the caller hears a ring. The call manager 54 performs a first query of the database 38 to determine if the incoming call is to a telephone number that belongs to a valid subscriber and a second database query to look up the target phone numbers if the telephone number belongs to a valid subscriber. Assuming a valid subscriber, the outgoing call manager 54 initiates the SS7 calls on the outbound channels of the user telephone line 16 for each of the target telephone numbers. When one of the target telephone numbers is answered or goes into some type of voice mail or automated answering machine system (through a PBX system or otherwise), the telephone network 12 notifies the outgoing call manager 52 that a call path connection has been made. In turn, the call manager 54 is notified of the connection and causes a Two-B Channel Transfer (TBCT) between the incoming caller and the connected outgoing line. When this occurs, the simultaneous ring system 10 is switched out of the connection. Consequently the simultaneous ring system 10 does not perform conferencing or bridging. In accordance with another embodiment, the simultaneous ring system 10 may maintain the connection between the caller and the target telephone number for the duration of the call if conferencing or bridging is desired.

In yet another embodiment, the outgoing call manager 52 may be configured to initiate the outgoing calls at various times to compensate for different set-up times of the target telephone numbers so that they all ring at substantially the same time. For example, a local call to a land-based phone typically takes approximately 750 milliseconds to establish a connection and to start ringing whereas a connection for long distance call may require 1,250 milliseconds or a call to a cell phone may require 4,250 milliseconds. Accordingly, the outgoing call manager 52 can be configured to introduce a dynamic delay before initiating calls to local land-base telephones until a ringing signal is detected from all the target cell phone and/or long distance telephone numbers. Alternatively, the outgoing call manager can be programmed to a configurable fixed delay so that all the target phone numbers ring at substantially the same time. For example, a call to a local land based phone may be delayed 3,500 milliseconds so that it may simultaneously ring with a target cell phone. It should be noted that the aforementioned dynamic and fixed delays are only exemplary and that a delay of any time period may be used to achieve substantial simultaneous ringing.

Figure 4:
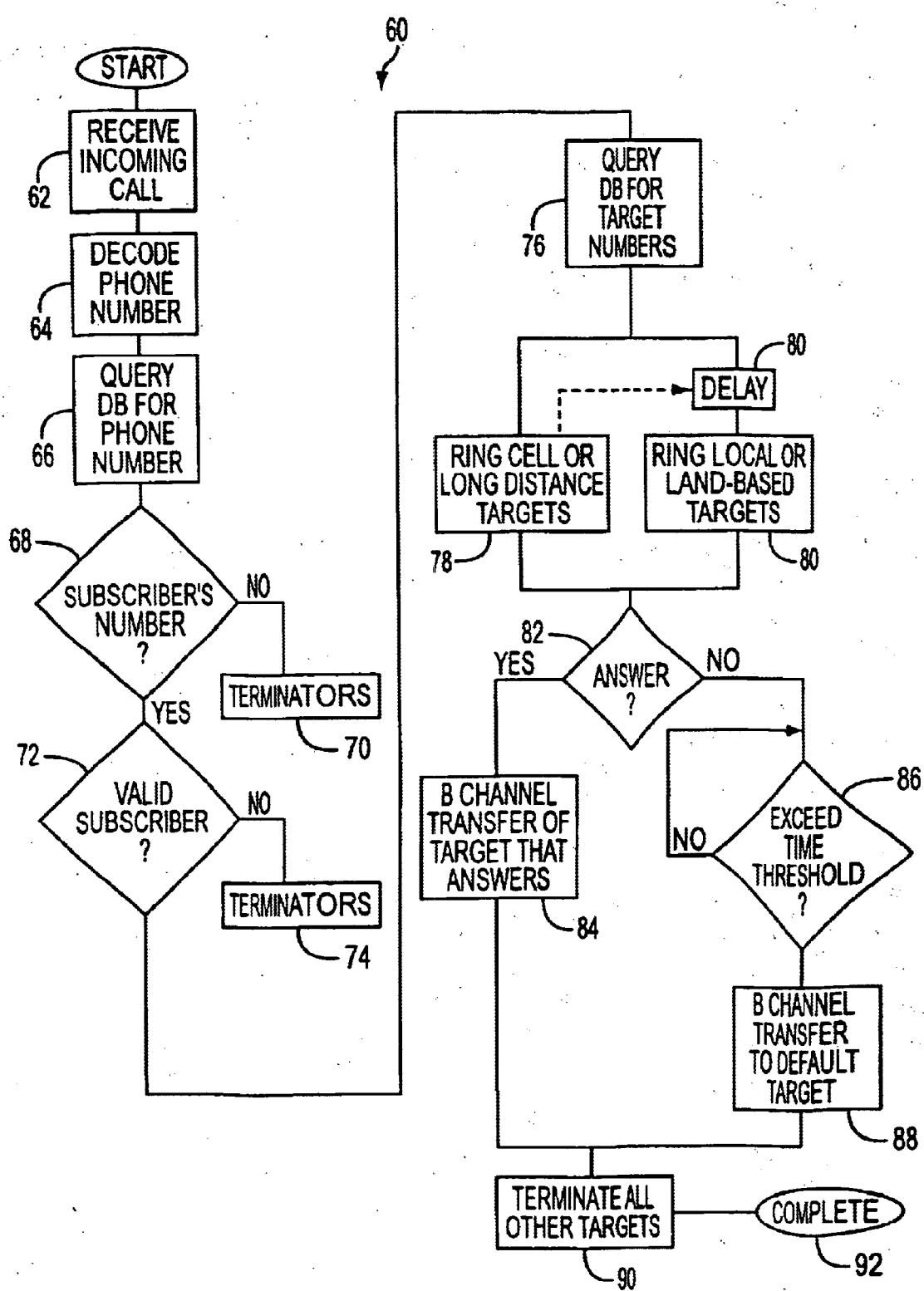
FIG. 4 is a flow diagram illustrating the operation of the simultaneous ring system of the present invention.

Referring to FIG. 4, a flow diagram 60 illustrating the operation of the simultaneous ring system 10 is shown. Initially the simultaneous ring system 10 receives an incoming call (step 62) over the user telephone line 16. The simultaneous ring software 36 decodes the phone number (step 64) and then queries the database 38 (step 66) to determine if the phone number belongs to a subscriber (decision diamond 68). If the phone number does not belong to a subscriber, the processing of the incoming call is terminated (step 72). If the phone number belongs to a subscriber, the simultaneous ring system 10 then determines if the subscriber is valid (decision diamond 72). If the subscriber is not valid, the system terminates the call processing (step 74). If valid, the system 10 again queries the database 38 for the target telephone numbers associated with the incoming telephone number (step 76). Next the simultaneous ring system 10 initiates calls to the target cell phone numbers (if present), the long distance numbers (if present) (step 78) and the local land-based phone numbers (if present) (step 80). Depending on the embodiment used, the system 10 may introduce either a dynamic and/or a configurable delay (step 80) before initiating the calls to the land-based local numbers so they may ring substantially simultaneously with the long distance calls or cell phone calls. Once the target phone numbers are called, the system 10 determines if one of the targets is answered (decision diamond 82). If yes, a Two B Channel Transfer (TBCT) to the target that answered is performed (step 84). If no target answers before the predetermined threshold expires (decision diamond 86), then a Two B Channel Transfer to the default target telephone number (step 88) is performed. When the Two B Channel Transfer occurs, the calls to the other targets are terminated (step 90) and the processing of the incoming call is complete (step 92).

Figure 5:
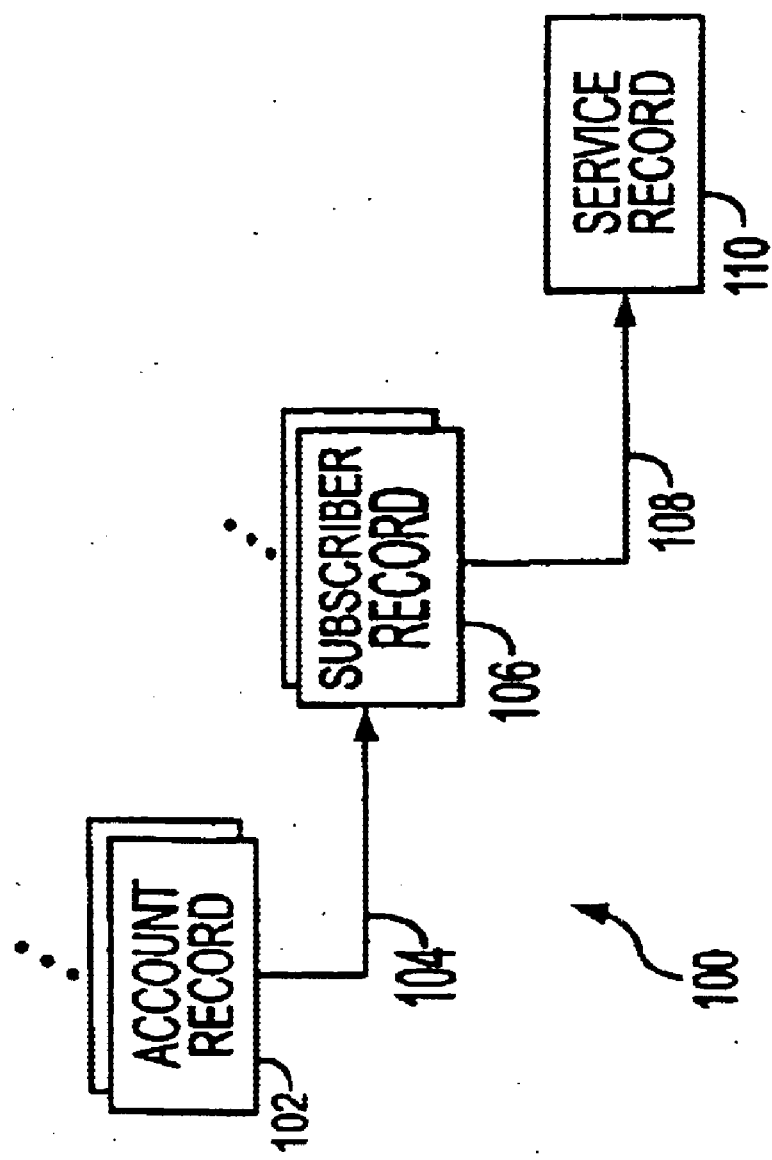
FIG. 5 is a block diagram of a database hierarchy used in the simultaneous ring system of the present invention.

Referring to FIG. 5, a block diagram illustrating the database hierarchy 100 of the database 38 is shown. The database 38 includes a plurality of account records 102. Each account record includes information related to a billing entity for a subscriber. For example, if the billing entity is an individual, the account record 102 typically includes the billing address, information on how to bill the account (i.e.

a credit card that is billed every month), and whether the user has available credit to cover outgoing toll calls to target long distance or international numbers. With corporate accounts, the account record 102 also includes billing information, available credit, and how many subscribers are associated with the corporate account. In addition, the each account record 102 includes a pointer 104 to one or more subscriber records 106. Each subscriber record 106 includes the subscriber's name, email address, user-defined password, other personal information, and a flag which determines if the subscriber is valid or not. If the account record 102 is for an individual, then only one subscriber record 106 is provided. On the other hand, if the account record 102 is for a corporation, business or other organization or entity, then multiple subscriber records 106 are provided, one for each subscriber. Each subscriber record 106 also includes a pointer 108 to a service record 110. The service record 110 includes the primary telephone number assigned to the subscriber, the target telephone number(s), associated with the primary number, and information related to each target phone number (i.e., cell, long distance, international, etc.).

Figure 6:
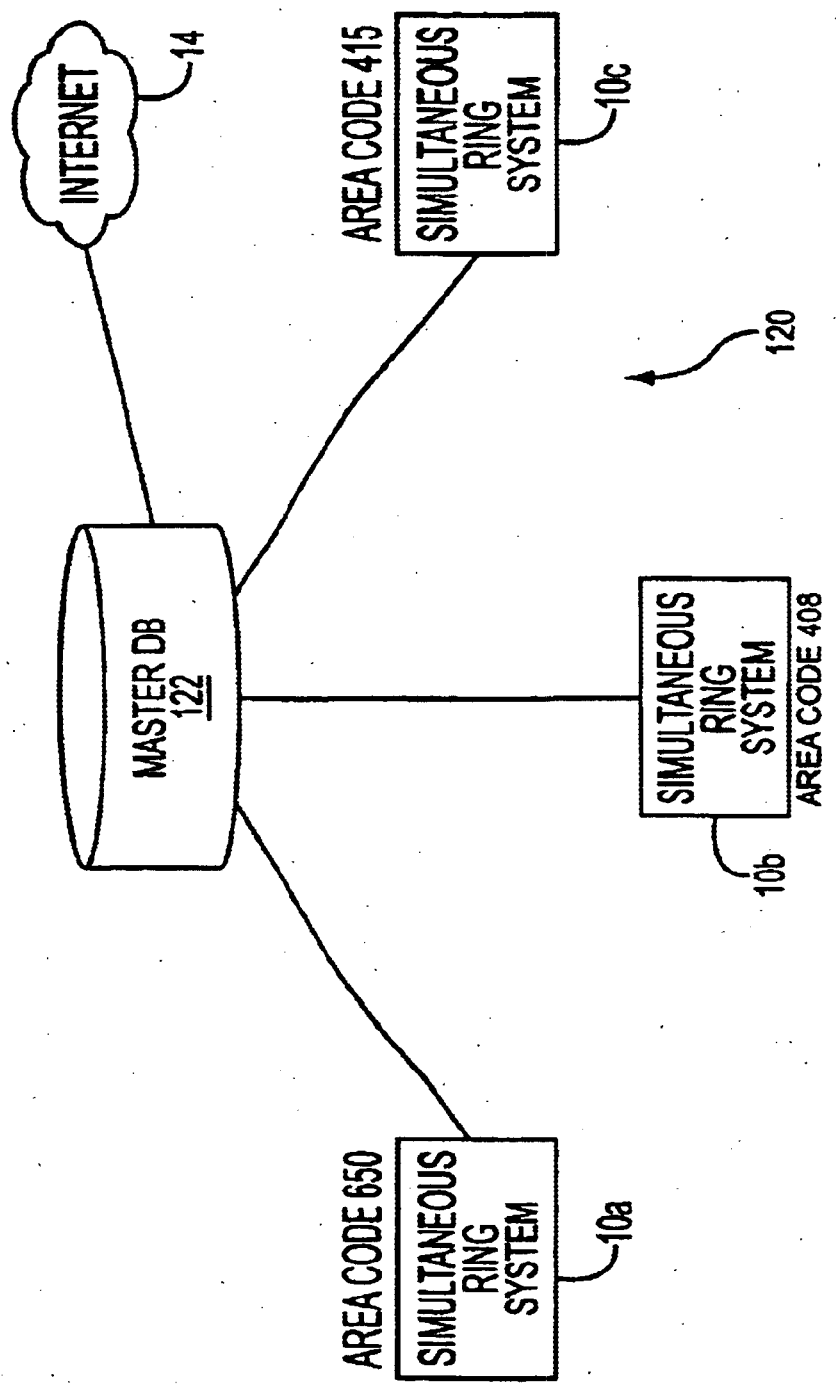
FIG. 6 is a block diagram of a network of simultaneous ring systems according to one embodiment of the present invention.

Referring to FIG. 6, a block diagram of a network 120 of simultaneous ring systems 10 is shown. Specifically in this example, simultaneous ring systems 10a, 10b, and 10c are provided for area codes 650, 408 and 415 respectively. A master database 122, which includes all of the account records 1.02, subscriber records 106 and service records 110 for the entire system 120, is coupled to each of the simultaneous ring systems 10a, 10b and 10c respectively. The database 38 in each simultaneous ring system 10a, 10b, and 10c includes a second copy of the subscriber records 106 and service records 110 for subscribers having a primary number within the 650, 408, and 415 area code respectively. With this arrangement, an Internet user can access the master database 120 via a single web portal over the Internet 14 and sign up for the simultaneous ring service or manage an existing account, regardless of which area code they live in. For example, when a subscriber living in the 415 area code creates or updates an account, the account information is written into the master database 122 and into the local database 38 within the system 10a. Thus a regional, nationwide or oven a global simultaneous ring system can be implemented and accessed from a single web page portal. It should be noted that the embodiment shown in FIG. 6 is only exemplary. In area codes with many local exchanges, a similar arrangement with one or more systems 10 for each exchange may be provided.

Figure 7A:
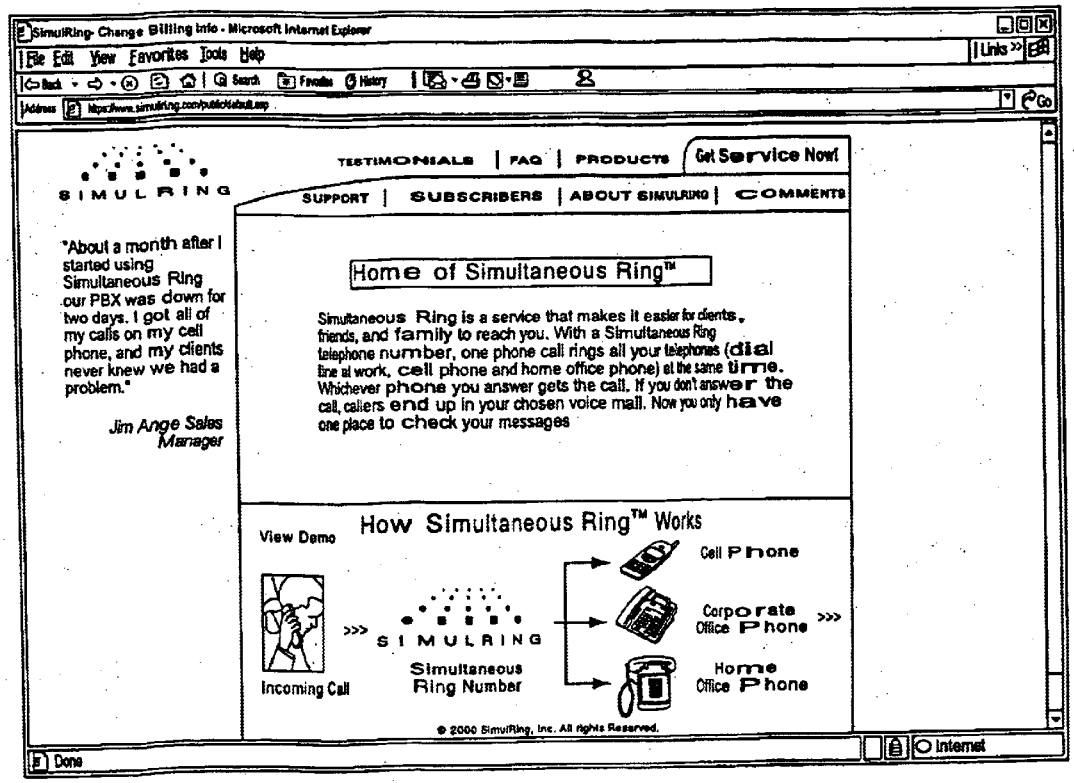

Referring to FIGS. 7A through 7J, a series of web pages illustrating the sign-up and administration of an account on the simultaneous ring system 10 is shown. In FIG. 7A, a home page describing the simultaneous ring system 10 is shown. Also provided is a "Get Service Now" icon and a "Subscribers" icon. It should be noted that the web pages of FIG. 7A through 7J are only exemplary and other web pages with the same or a different look, feel, and sequence could be used.

Figure 7B:
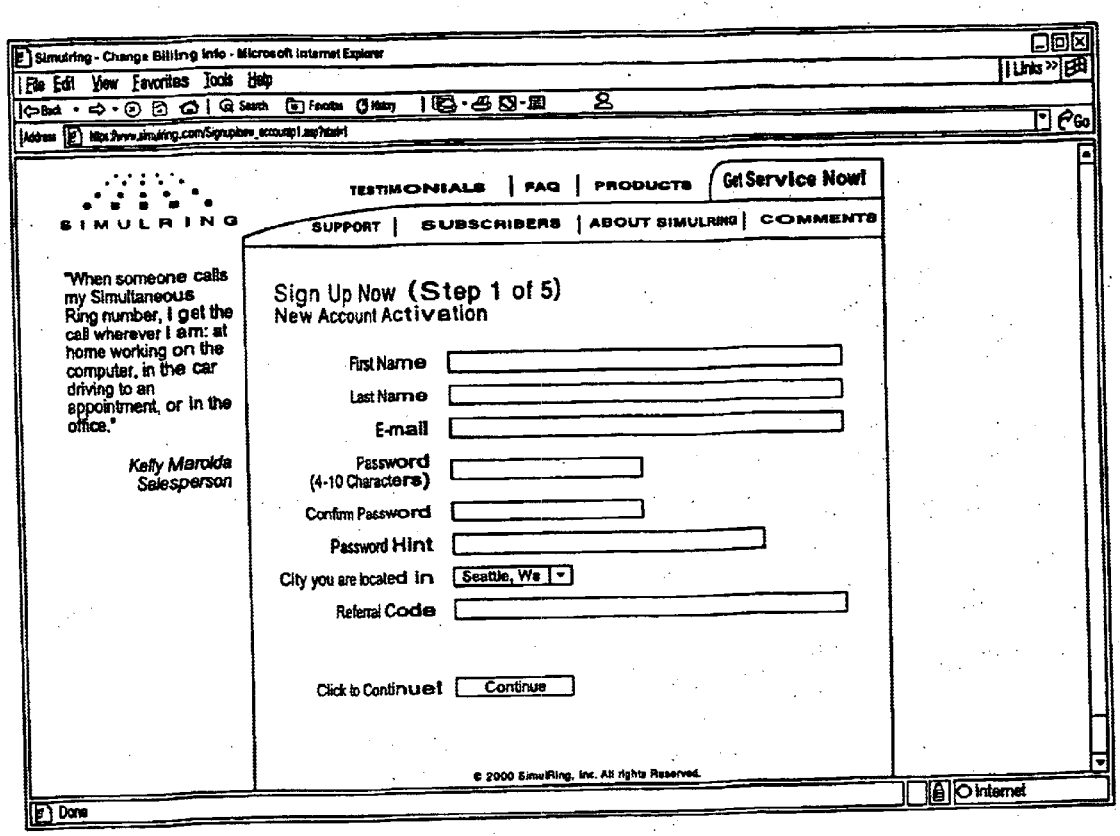
Figure 7C:
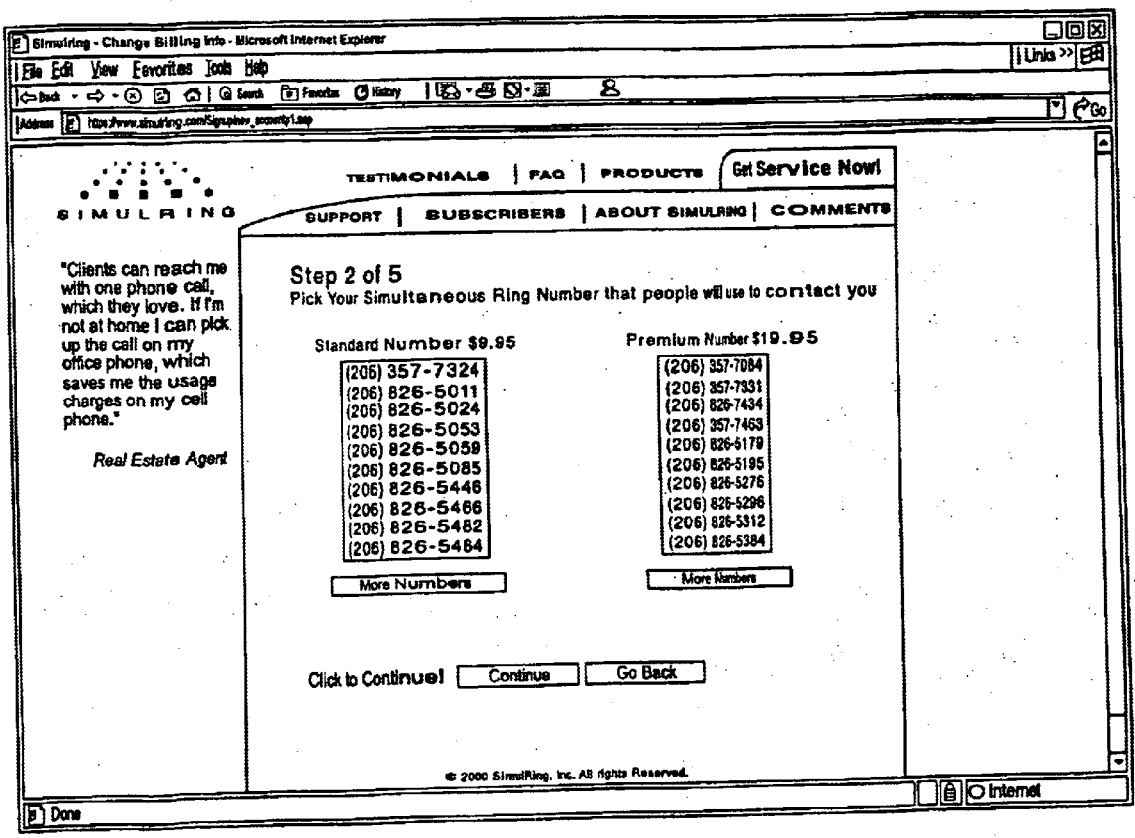
Figure 7D:
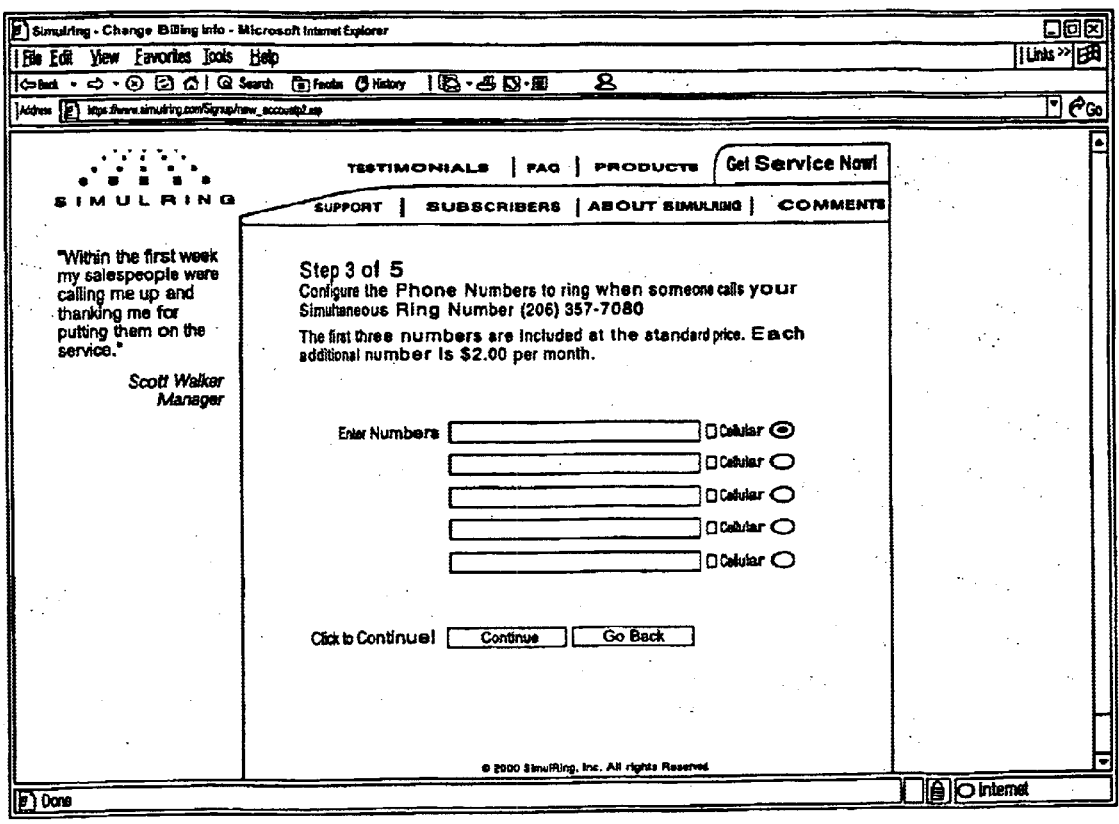
Figure 7E:
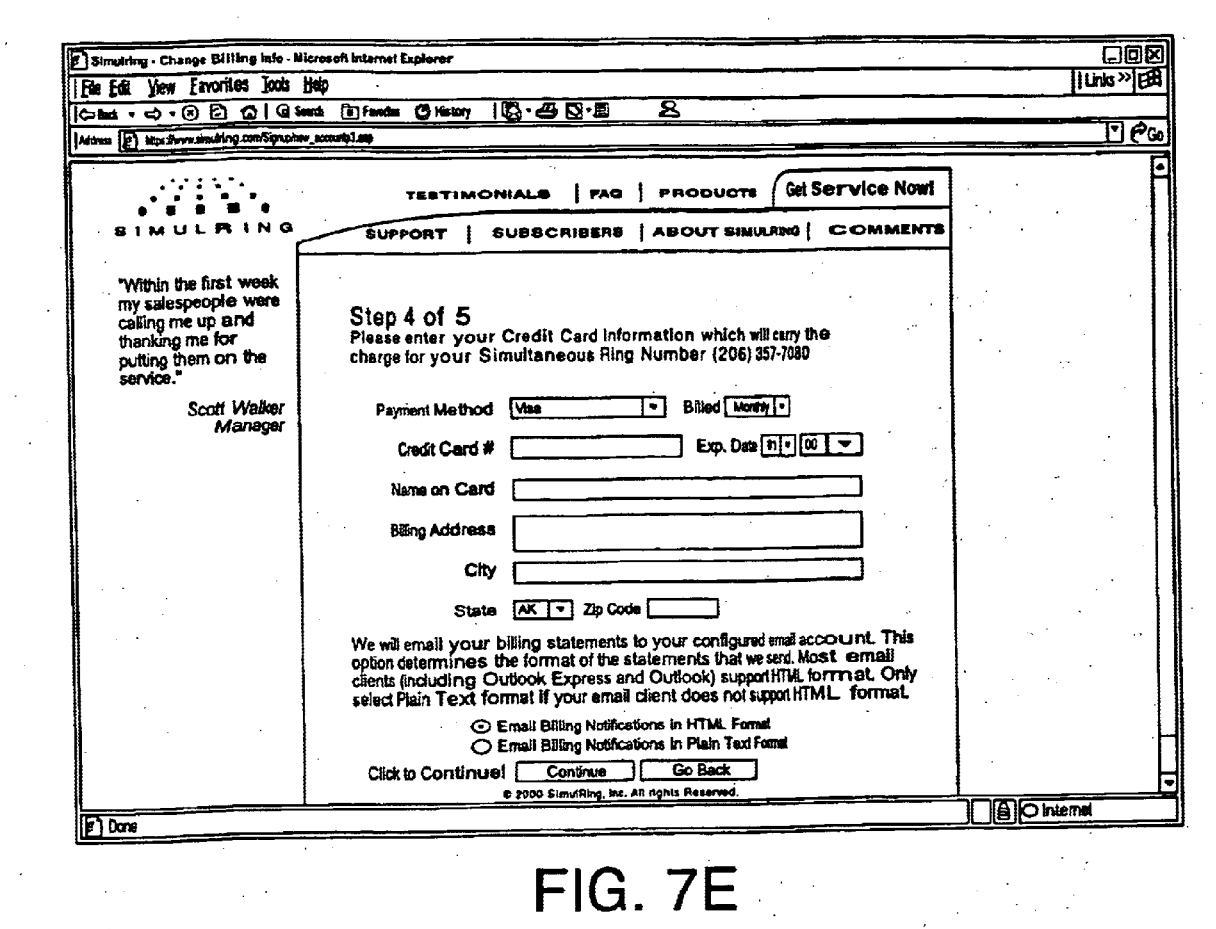
Figure 7F:
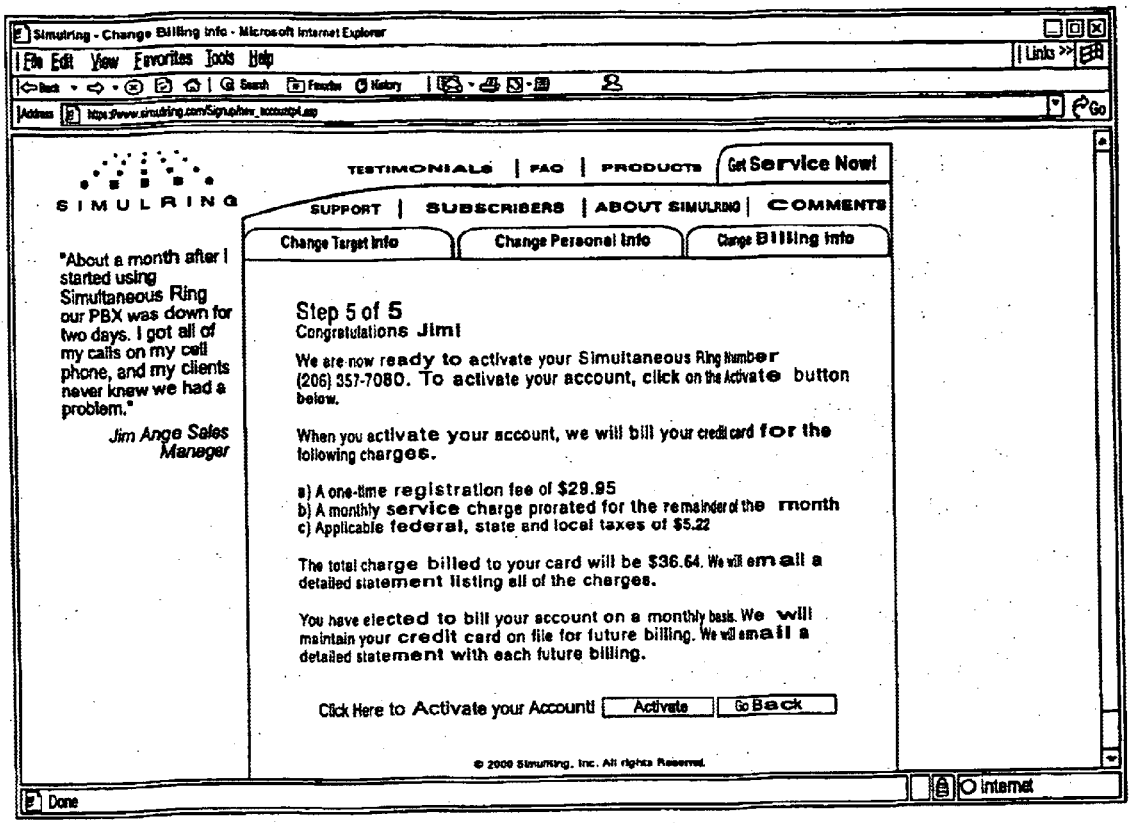

When the Get Service Now icon is selected, the web page illustrated in FIG. 7B is displayed. This web page enables the user to become a subscriber by completing and submitting the name, email, password, city, etc. data entry fields. When this information is correctly entered using the "Continue" icon, the web page of FIG. 7C appears. With this page, the user selects their primary telephone number. In the embodiment shown, standard numbers are provided at one price and more desirable "premium" numbers are provided at a higher price. In one embodiment, the displayed numbers are affiliated with the ISDN PRI (or group of PRI telephone connections) associated with the standard telephone line 16. Once a primary number is selected and entered by clicking the "Continue" icon, the web page of FIG. 7D appears. With this page, the user is required to enter their target phone numbers and indicate if each number is cellular or not and if voice mail is associated with the number. Generally only one entered number has voice mail and this number becomes the user's "default" number. When this information is entered using the "Continue" icon, the web page of FIG. 7E appears. With this page, the user is required to enter their credit card, address, and other billing information. Again when the user enters this information using the "Continue" icon, the web page of FIG. 7F appears. On this page, the user is presented with a text message of the cost of the service, billing procedures, etc. and an "Activate" icon. When the Activate icon is selected, all the information previously entered is written into the various records of the database 38 and the user becomes a subscriber.

Figure 7G:
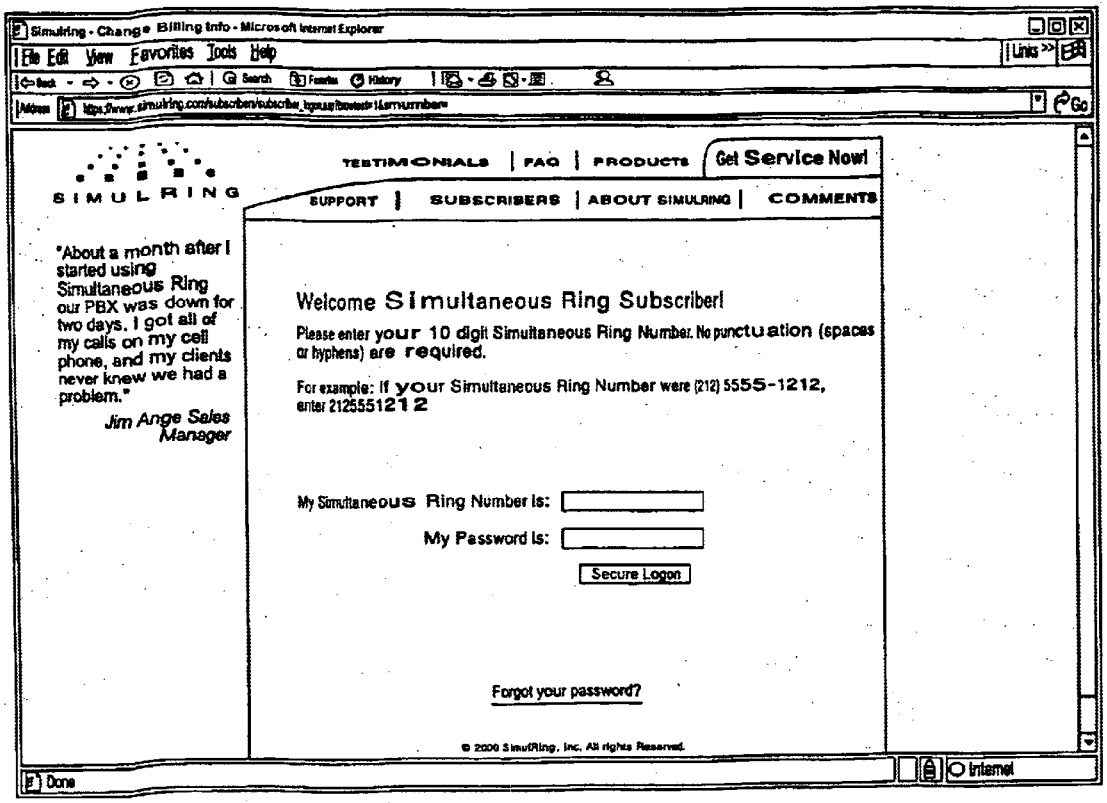
Figure 7H:
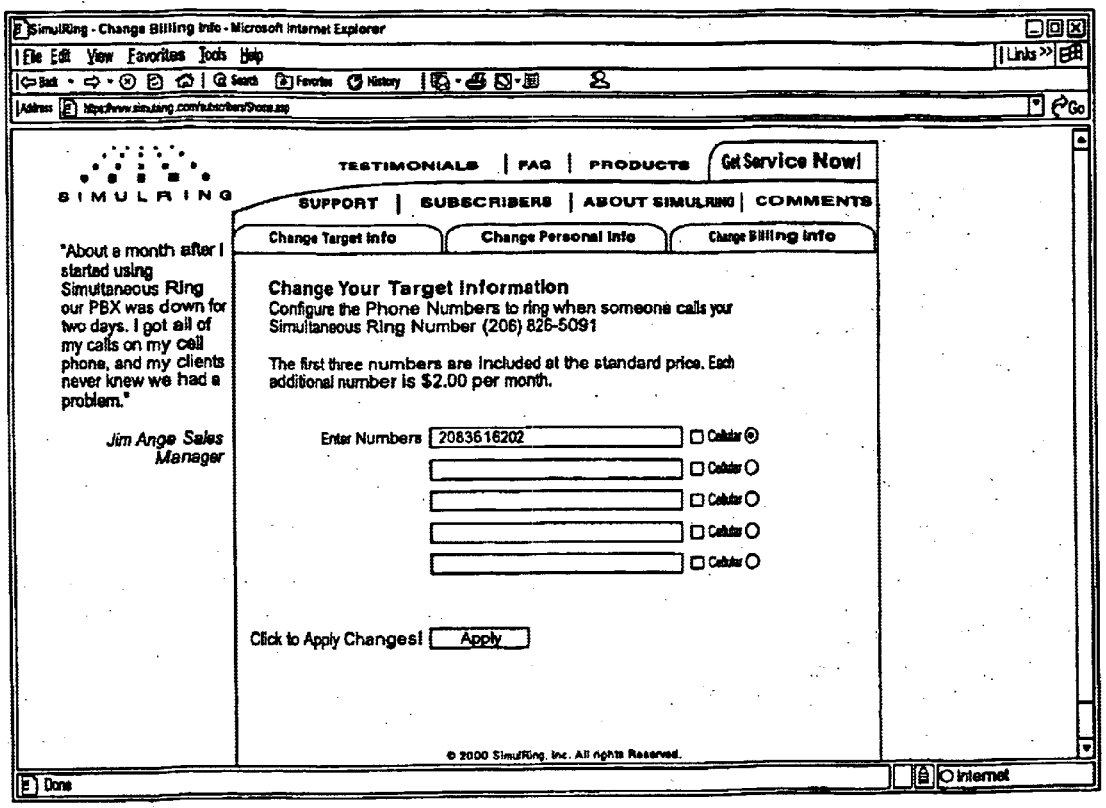
Figure 7I:
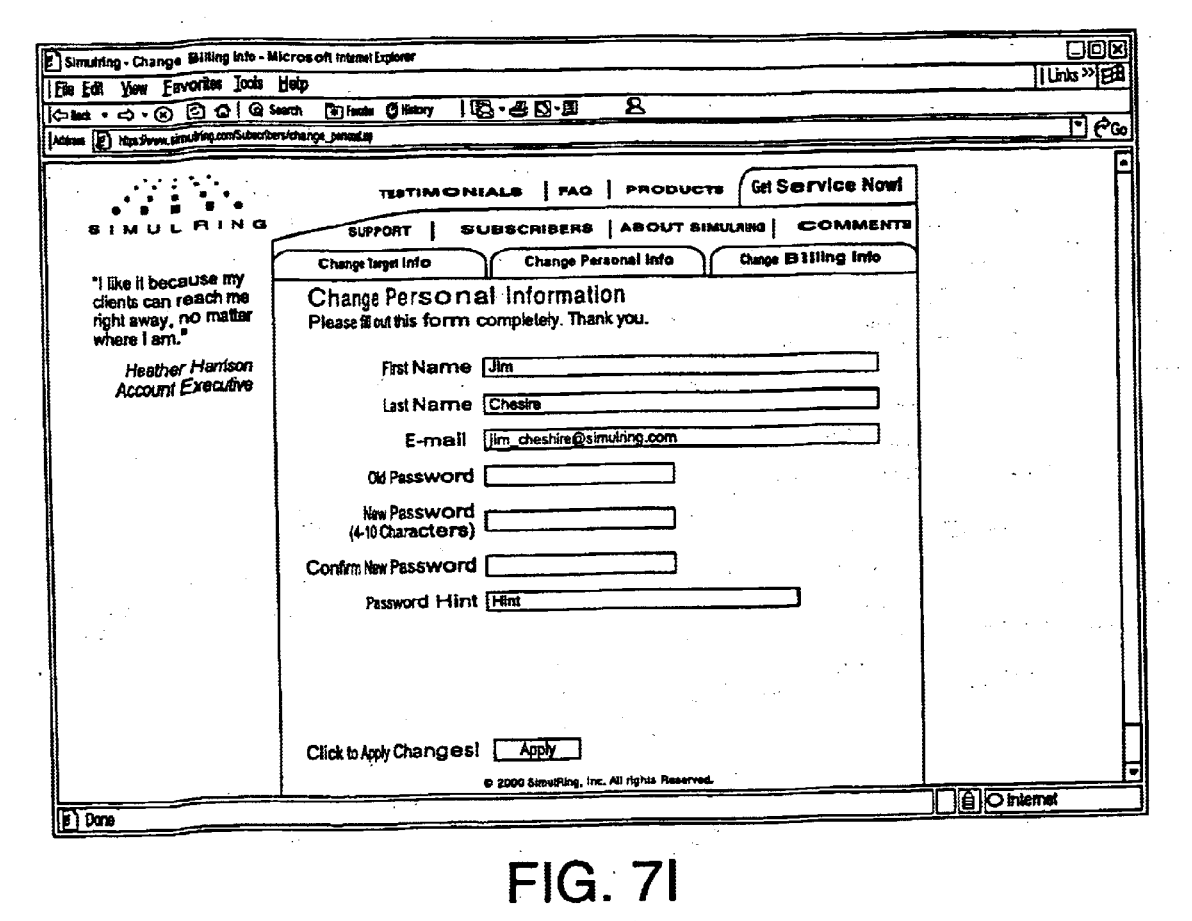
Figure 7J:
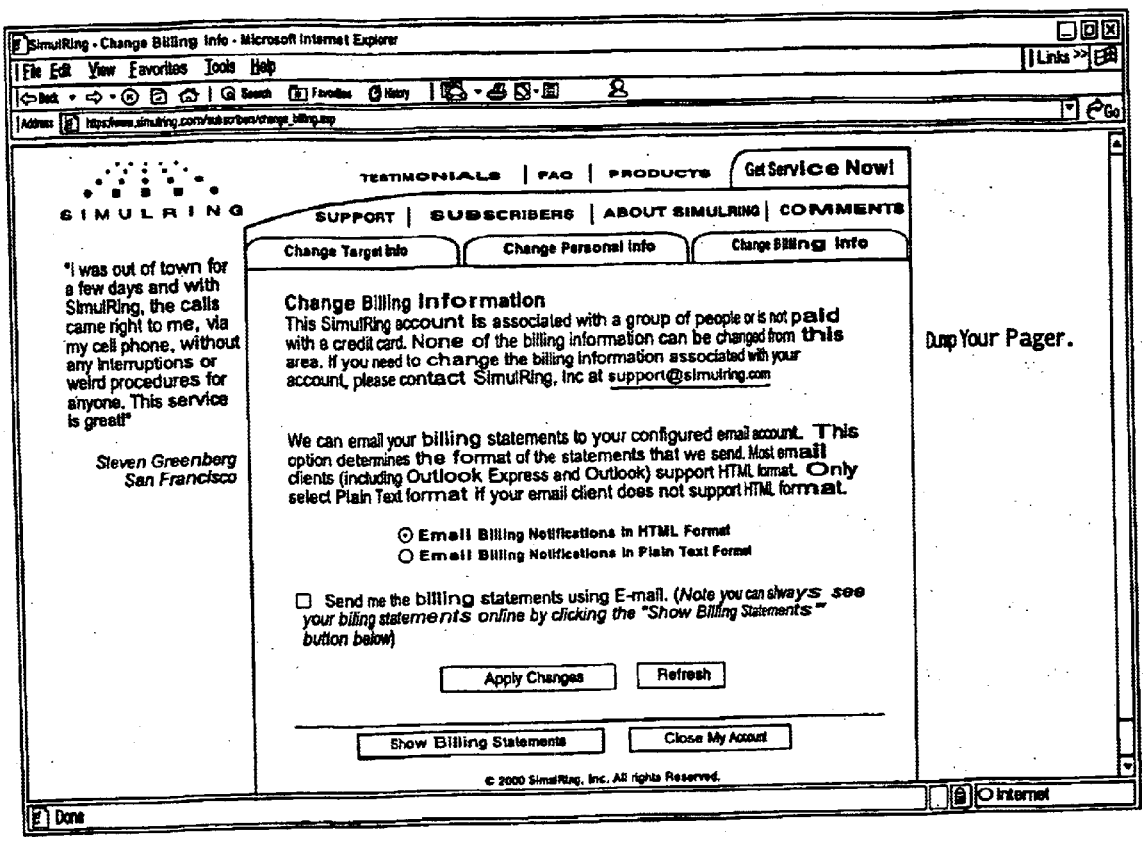

When the Subscribers icon is selected, the web page of FIG. 7G appears. This page requests a subscriber to enter their simultaneous ring (e.g. their primary) number and their previously defined password. Once this information is entered using the "Secure Logon" icon, the web page of FIG. 7H appears. This page enables the subscriber to change or add additional target numbers. Similarly the web page of FIG. 7I allows the subscriber to update their personal information and the web page of FIG. 7J allows the subscriber to update their billing information.

Although only a few embodiments of the present invention have been described, it should be understood that the present invention may be embodied in many other specific forms without departing from the true spirit or the scope of the invention. Therefore, the present examples are to be considered as illustrative and not restrictive, and the invention is not to be limited to the details given herein, but may be modified within the scope of the appended claims.

What is claimed is:

1. A method in a simultaneous-ring system for providing simultaneous-ring telecommunication services, the simultaneous-ring system being connected to a telecommunications network via a system telephone line, the method comprising:

receiving through the system telephone line at the simultaneous-ring system a telephone call from the telecommunications network, the received telephone call being directed to a first telephone number;

upon receiving the telephone call at the simultaneous-ring system, retrieving at the simultaneous-ring system a plurality of target telephone numbers that are associated with the first telephone number;

placing by the simultaneous-ring system a telephone call to each target telephone number through the system telephone line to the telecommunications network; and when the simultaneous-ring system is notified by the telecommunications network that a placed telephone call has been answered, submitting a request by the simultaneous-ring system to the telecommunications network to transfer the received telephone call and the answered telephone call so that a connection between the received telephone call and the answered telephone call is established that does not include the system telephone line whereby the simultaneous-ring system is not part of the connection between the received telephone call and the answered telephone call.

2. The method according to claim 1, wherein transferring of the received telephone call transfers the received telephone call to the telecommunications network using a Signaling System 7 (SS-7) signaling technique.

3. The method according to claim 2, wherein the SS-7 signaling technique is a Two B-channel transfer (TBCT).

4. The method according to claim 1, wherein the placing of a telephone call to each target telephone number rings each target telephone number substantially simultaneously.

5. The method according to claim 1,
wherein the plurality of target telephone numbers includes a default target telephone number, and
wherein the method further comprises transferring the received telephone call to the default target telephone number when a connection is not made with any of the other target telephone numbers that are associated with the first telephone number.

6. The method according to claim 5, wherein the default target telephone number is based on a time of day the telephone call was received from the telecommunications network.

7. The method according to claim 5, wherein the default target telephone number is based on a day of the week the telephone call was received from the telecommunications network.

8. The method according to claim 1, wherein the placing of a telephone call to each target telephone number further comprises initiating a call to each respective target telephone number at substantially a same time.

9. The method according to claim 1, wherein the placing of a telephone call to each target telephone number further comprises initiating each respective call at a selected time based on a set-up time associated with each respective target telephone number so that each telecommunications device associated with the target telephone numbers rings at substantially the same time.

10. The method according to claim 1, wherein the placing of a telephone call to each target telephone number further comprises initiating at least one call to a target telephone number after a ringing signal is detected for a call to a selected target telephone number so that each telecommunications device associated with the target telephone numbers rings at substantially the same time.

11. The method according to claim 10, wherein the telecommunications device associated with the selected target telephone number is a cellular telephone device.

12. The method according to claim 1, further comprising terminating all placed telephone calls except the placed telephone call that is answered.

13. The method according to claim 1, wherein the system telephone line is one of an Integrated Services Digital Network (ISDN) Primary Rate Interface (PRI); an ISDN PRI European Standard; and an ISDN Basic Rate Interface (BRI).

14. The method according to claim 1, further comprising determining whether the first telephone number is associated with a valid subscriber before placing a telephone call to each target telephone number.

15. The method according to claim 1, further comprising forwarding caller ID information associated with the received telephone call to the target telephone number of the answered telephone call.

16. The method according to claim 1, wherein the retrieving of the plurality of target telephone numbers retrieves the plurality of target telephone numbers from a database.

17. The method according to claim 16, wherein the database contains a subscriber record having account information relating to a subscriber associated with the first telephone number and a target record containing target telephone number information associated with the first telephone number.

18. The method according to claim 17, wherein the account information relating to the subscriber includes at least one of account status information relating to the subscriber; credit status information relating to the subscriber; and personal information relating to the subscriber.

19. The method according to claim 17, wherein the target record includes at least one the plurality of target telephone numbers; a default target telephone number; a time of data default telephone target number; and a day of week default target telephone number.

20. A simultaneous-ring apparatus for connecting to a telecommunications network via a telephone line, the apparatus comprising:
an incoming call manager receiving an incoming telephone call from the telecommunications network via the telephone line, the received telephone call being directed to a first telephone number; and
an outgoing call manager generating a plurality of simultaneous outgoing telephone calls via the telephone line, each outgoing telephone call being directed to one of a plurality of target telephone numbers that are associated with the first telephone number, each target telephone number having an associated telecommunications device, the outgoing call manager transferring the received incoming telephone call to the telecommunications network when a connection is made to a telecommunication device associated with one of the plurality of target telephone numbers so that a connection between the incoming telephone call and the connected-to telecommunication device is established that does not include the telephone line whereby the simultaneous-ring apparatus is not Dart of the established connection.

21. The apparatus according to claim 20, wherein outgoing call manager transfers the received telephone call to the telecommunications network using a Signaling System 7 (SS-7) signaling technique.

22. The apparatus according to claim 21, wherein the SS-7 signaling technique is a Two B-channel transfer (TBCT).

23. The apparatus according to claim 20, wherein each outgoing telephone call generated by the outgoing call manager rings substantially simultaneously.

24. The apparatus according to claim 20,
wherein the plurality of target telephone numbers includes a default target telephone number, and
wherein the outgoing call manager transfers the received incoming telephone call to the default target telephone number when a connection is not made with any of the other target telephone numbers associated with the first telephone number.

25. The apparatus according to claim 20, further comprising a call manager determining whether the first telephone number is associated with a valid subscriber, and retrieving the plurality of target telephone numbers from a database when the first telephone number is determined to be associated with a valid subscriber.

26. The apparatus according to claim 25, wherein the database contains a subscriber record having account information relating to a subscriber associated with the first telephone number and a target record containing target telephone number information associated with the first telephone number.

27. The apparatus according to claim 26, wherein the account information relating to the subscriber includes at least one of account status information relating to the subscriber; credit status information relating to the subscriber; and personal information relating to the subscriber.

28. The apparatus according to claim 26, wherein the target record includes at least one of the plurality of target telephone numbers; a default target telephone number; a time of day default telephone target number; and a day of week default target telephone number.

29. The apparatus according to claim 25, wherein the default target telephone number is based on a time of day the incoming telephone call is received.

30. The apparatus according to claim 25, wherein the default target telephone number is based on a day of the week the incoming telephone call is received.

31. The apparatus according to claim 20, wherein the outgoing call manager generates a ringing signal for the received telephone call.

32. The apparatus according to claim 20, wherein the outgoing call manager terminates all outgoing telephone calls except the outgoing telephone call in which the connection is made to the telecommunication device.

33. The apparatus according to claim 20, wherein the outgoing call manager initiates each of the plurality of outgoing telephone calls at substantially the same time.

34. The apparatus according to claim 20, wherein the outgoing call manager initiates each respective outgoing telephone call at a selected time based on a set-up time associated with each respective target telephone number so that each telecommunications device associated with a target telephone number rings at substantially the same time.

35. The apparatus according to claim 20, wherein the outgoing call manager initiates at least one call to a target telephone number after a ringing signal is detected for a call to a selected target telephone number so that each telecommunications device associated with the target telephone number rings at substantially the same time.

36. The apparatus according to claim 35 wherein the telecommunications device associated with the selected target telephone number is a cellular telephone device.

37. The apparatus according to claim 20, wherein the telephone line is one of an Integrated Services Digital Network (ISDN) Primary Rate Interface (PRI); an ISDN PRI European Standard; and an ISDN Basic Rate Interface (BRI).

38. The apparatus according to claim 20, wherein the outgoing call manager forwards caller ID information associated with the received incoming telephone call to the target telephone number with which the connection is made.

39. A computer-readable medium having computer-executable instructions for performing steps comprising:
    receiving at a multiple-ring system via a telephone line a telephone call from a telecommunications network, the received telephone call being directed to a first telephone number;
    retrieving by the multiple-ring system a plurality of target telephone numbers that are associated with the first telephone number in response to the received telephone call, each target telephone number having an associated telecommunications device;
    calling by the multiple-ring system each target telephone number via the telephone line; and
    transferring by the multiple-ring system the received telephone call to the telecommunications network when a connection is made to a telecommunications device associated with one of the plurality of target telephone numbers so that a connection between the received telephone call and the connected-to telecommunications device is established that does not include the telephone line whereby the multiple-ring system is not Dart of the established connection.

40. The computer-readable medium according to claim 39, wherein the step of transferring the received telephone call transfers the received telephone call using a Signaling System 7 (SS-7) signaling technique.

41. The computer-readable medium according to claim 40, wherein the SS-7 signaling technique is a Two B-channel transfer (TBCT).

42. The computer-readable medium according to claim 39, wherein the step of calling each target telephone number rings each target telephone number substantially simultaneously.

43. The computer-readable medium according to claim 39, wherein the plurality of target telephone numbers includes a default target telephone number, and including transferring the received telephone call to the default target telephone number when a connection is not made with any of the other target telephone numbers that are associated with the first telephone number.

44. The computer-readable medium according to claim 43, wherein the default target telephone number is based on a time of day the telephone call was received from the telecommunications network.

45. The computer-readable medium according to claim 43, wherein the default target telephone number is based on a day of the week the telephone call was received from the telecommunications network.

46. The computer-readable medium according to claim 39, wherein the step of calling each target telephone number further comprises a step of initiating a call to each respective target telephone number at substantially the same time.

47. The computer-readable medium according to claim 39, wherein the step of calling each target telephone number further comprises a step of initiating each respective call at a selected time based on a set-up time associated with each respective target telephone number so that each telecommunications device associated with the target telephone numbers rings at substantially the same time.

48. The computer-readable medium according to claim 39, wherein the step of calling each target telephone number further comprises a step of initiating at least one call to a target telephone number after a ringing signal is detected for a call to a selected target telephone number so that each telecommunications device associated with the target telephone numbers rings at substantially the same time.

49. The computer-readable medium according to claim 48, wherein the telecommunications device associated with the selected target telephone number is a cellular telephone device.

50. The computer-readable medium according to claim 39, wherein the telephone line is one of an Integrated Services Digital Network (ISDN) Primary Rate Interface (PRI); an ISDN PRI European Standard; and an ISDN Basic Rate Interface (BRI).

51. The computer-readable medium according to claim 39, further comprising a step of determining whether the first telephone number is associated with a valid subscriber before the step of calling each target telephone number.

52. The computer-readable medium according to claim 39, further comprising a step of forwarding caller ID information associated with the received telephone call to the target telephone number with which the connection is made.

53. The computer-readable medium according to claim 39, wherein the step of retrieving the plurality of target telephone numbers retrieves the plurality of target telephone numbers from a database.

54. The computer-readable medium according to claim 39, wherein the database contains a subscriber record having account information relating to a subscriber associated with the first telephone number and a target record containing target telephone number information associated with the first telephone number.

55. The computer-readable medium according to claim 39, wherein the account information relating to the subscriber includes at least one of account status information relating to the subscriber; credit status information relating to the subscriber; and personal information relating to the subscriber.

56. The computer-readable medium according to claim 54, wherein the target record includes at least one of the plurality of target telephone numbers; a default target telephone number; a time of day default telephone target number; and a day of week default telephone number.

* * * * *

UNITED STATES PATENT AND TRADEMARK OFFICE
CERTIFICATE OF CORRECTION

PATENT NO.    : 6,697,478 B1
DATED         : February 24, 2004
INVENTOR(S)   : Robert G. Meldrum et al.

It is certified that error appears in the above-identified patent and that said Letters Patent is hereby corrected as shown below:

Column 1,
Line 4, please insert the following paragraph, -- This application is related to and concurrently filed with U.S. Patent Application No. _____ (Attorney Docket No.: BELLPOO2), entitled "DIRECT RING TELEPHONE APPARATUS AND METHOD" naming Meldrum et al. As inventors which is herein incorporated by reference. --

Column 2,
Line 6, please delete "i.e." and replace with -- e.g. --;

Column 3,
Line 26, please delete "i.e." and replace with -- e.g. --;
Line 37, please delete "by" and replace with -- be --;

Column 4,
Line 47, after "may", please insert -- optimally --;
Line 67, please delete "i.e." and replace with -- e.g. --;

Column 5,
Line 6, after "addition," please delete "the";
Line 21, please delete "i.e." and replace with -- e.g. --;

Signed and Sealed this

Twenty-eighth Day of September, 2004

JON W. DUDAS
*Director of the United States Patent and Trademark Office*